Figure 3:
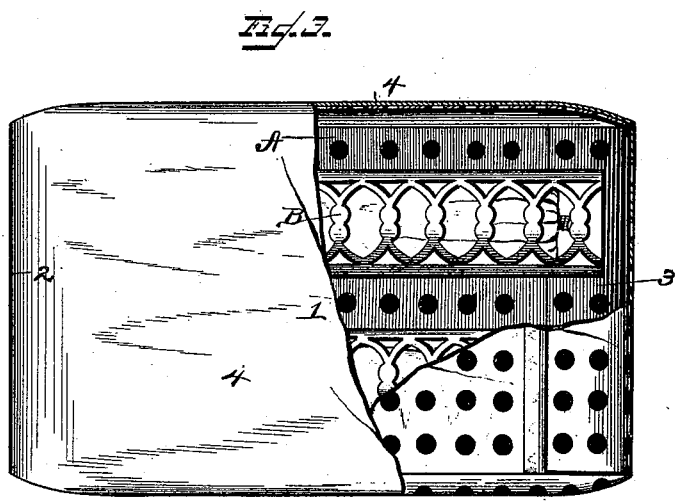

(No Model.) 2 Sheets—Sheet 1.
F. SCHOPF.
HAND WARMER.
No. 402,982. Patented May 7, 1889.
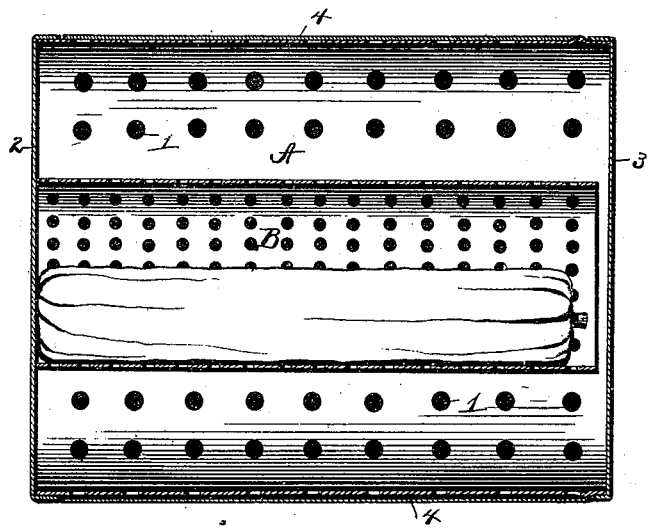
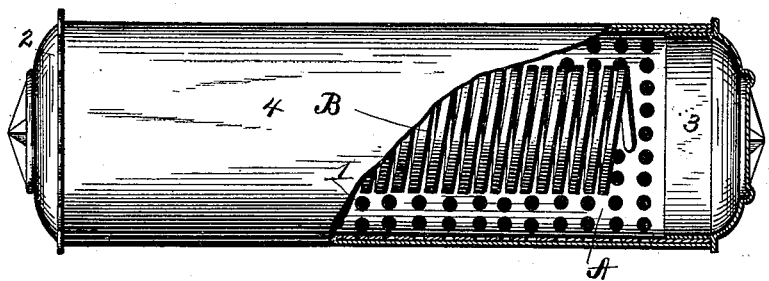
WITNESSES.
Franck L. Ourand
Wm. T. Bates
INVENTOR,
Frank Schopf
by A. G. Huylmm,
Attorney.

(No Model.) 2 Sheets—Sheet 2.

F. SCHOPF.
HAND WARMER.

No. 402,982. Patented May 7, 1889.

Witnesses.
Franck L. Ourand
Wm. H. Bates

Inventor.
Frank Schopf
by A. G. Heylmun
Attorney.

UNITED STATES PATENT OFFICE.

FRANK SCHOPF, OF NEW YORK, N. Y.

HAND-WARMER.

SPECIFICATION forming part of Letters Patent No. 402,982, dated May 7, 1889.

Application filed February 28, 1889. Serial No. 301,521. (No model.)

*To all whom it may concern:*

Be it known that I, FRANK SCHOPF, a citizen of the United States of America, residing at New York city, in the county and State of New York, have invented certain new and useful Improvements in Hand-Warmers, of which the following is a specification.

My invention relates to improvements in hand-warmers, being that style or character of small portable warming utensils used for depositing in muffs or similar articles, or for carrying in the pocket of garments.

In utensils of the character named a slow-burning and smokeless-burning cartridge has heretofore been used by simply depositing the cartridge loose in the casing or shell of the warmer. This arrangement of the cartridge makes it lie upon one side, which either interferes with its regular consumption, or causes it to heat the casing on one side more than the other, and even scorches or chars the covering of the shell. It is the object of my invention to remove these objections existing in the present condition of the art by constructing the utensil with a grate or perforated receptacle to receive and retain the cartridge and hold it from contact with the interior surface of the shell of the warmer. This arrangement of the cartridge holder or grate causes the fuel of the cartridge to burn evenly and to distribute the heat evenly throughout the warmer.

I have fully illustrated my invention in the accompanying drawings, wherein—

Figure 1 is a vertical central view of the casing with the grate arranged therein. Fig. 2 is a view of a case with a spiral grate therein. Fig. 3 is a case with two grates.

Reference being had to the drawings, A designates the sheet-metal casing, forming the side of the warming-shell and having a number of perforations, 1, throughout its area. To the casing is fixed a bottom, 2, and the cover 3 is hinged to the casing to close its open end. Instead of hinging the cover or lid, it may be made as a common lid to be held by a flange entering the rim of the shell, as usual, and as shown in Fig. 2 of the drawings. Over the sheet-metal shell of the warmer is secured a covering, 4, of some suitable textile material. In the bottom of the warmer is secured one end of a tubular grate, B, which may consist of a tube made of perforated metal sheet, or a band or wire bent spirally and having its ends suitably anchored in the shell. The grate is arranged so that the exterior surface shall not touch the casing, as shown. This, as stated, makes combustion regular and prevents the shell from becoming uncomfortably hot and the covering from being scorched or burned.

The fuel used is that usually prepared for implements of this character.

Having thus fully described my improved hand-warmer, I proceed to specifically and particularly point out what I claim as my invention, as follows:

1. A hand-warmer consisting of a perforated sheet-metal box, an outer covering, a cover to close the open end of the box, and a tubular grate, of substantially the length of the box, fixed in the box with one end left open and arranged in the box with a space between its exterior surface and the interior of the sides of the box, substantially as described.

2. A hand-warmer consisting of a perforated sheet-metal box, a cover, and a tubular grate consisting of a spiral coil fixed in the casing, substantially as described.

In witness whereof I have hereunto set my hand in the presence of two attesting witnesses.

FRANK SCHOPF.

Attest:
W. F. MILLER,
MARCELLUS H. BARILAT.